(12) United States Patent
Dharmadhikari et al.

(10) Patent No.: US 11,025,083 B2
(45) Date of Patent: Jun. 1, 2021

(54) ENERGY STORAGE SYSTEM

(71) Applicant: General Electric Company, Schenectady, NY (US)

(72) Inventors: Parag Rameshchandra Dharmadhikari, Neufahrn b. Freising (DE); Robert Roesner, Oberschleissheim (DE)

(73) Assignee: General Electric Company, Schenectady, NY (US)

( * ) Notice: Subject to any disclaimer, the term of this patent is extended or adjusted under 35 U.S.C. 154(b) by 31 days.

(21) Appl. No.: 15/961,008

(22) Filed: Apr. 24, 2018

(65) Prior Publication Data

US 2019/0326773 A1    Oct. 24, 2019

(51) Int. Cl.
| | |
|---|---|
| *F03D 9/11* | (2016.01) |
| *F03D 9/25* | (2016.01) |
| *H02J 7/00* | (2006.01) |
| *H02J 7/24* | (2006.01) |
| *H02M 5/458* | (2006.01) |

(52) U.S. Cl.
CPC ............... *H02J 7/24* (2013.01); *F03D 9/11* (2016.05); *F03D 9/255* (2017.02); *H02J 7/0068* (2013.01); *H02M 5/4585* (2013.01); *F05B 2220/70646* (2013.01)

(58) Field of Classification Search
CPC ........ H02J 7/242; H02J 7/0068; H02J 7/0024; H02J 2310/46; H02J 7/00; F03D 9/11; F03D 9/255; H02M 5/4585; F05B 2220/70646; B60L 50/66; B60L 1/00; B60L 2200/10; B60L 2200/32; B60L 58/21; B60L 15/007; B60L 58/10; B60Y 2200/91; B60Y 2400/112; Y02T 10/70; Y02T 10/64; B60R 16/033
USPC ................... 307/20, 43, 82; 290/44; 322/28
See application file for complete search history.

(56) References Cited

U.S. PATENT DOCUMENTS

| | | |
|---|---|---|
| 3,548,278 A | 12/1970 | Sommeria |
| 5,355,025 A | 10/1994 | Moran et al. |
| 5,384,696 A | 1/1995 | Moran et al. |

(Continued)

FOREIGN PATENT DOCUMENTS

| | | |
|---|---|---|
| WO | WO2002054561 A2 | 7/2002 |
| WO | WO 2017/148252 A1 | 9/2017 |

OTHER PUBLICATIONS

U.S. Appl. No. 15/494,642, filed Apr. 24, 2017.

(Continued)

*Primary Examiner* — Toan T Vu
(74) *Attorney, Agent, or Firm* — Dority & Manning, P.A.

(57) ABSTRACT

The present disclosure is directed to an energy storage system including a power source and a power converter coupled to the power source. The power converter is configured to output power suitable for consumption in a utility grid. The energy storage system also includes an energy storage device configured to receive the power output from the power converter and a charge discharge converter coupled between the power converter and the energy storage device. The charge discharge converter is configured to control at least one of charging or discharging the energy storage device. Furthermore, the energy storage device includes a transformer coupled between the charge discharge converter and the power converter.

7 Claims, 6 Drawing Sheets

(56) References Cited

U.S. PATENT DOCUMENTS

| | | | |
|---|---|---|---|
| 5,767,591 | A | 6/1998 | Pinkerton |
| 5,907,192 | A | 5/1999 | Lyons et al. |
| 7,633,775 | B2 | 12/2009 | Datta et al. |
| 8,446,743 | B2 | 5/2013 | Gupta et al. |
| 8,867,244 | B2 | 10/2014 | Trainer et al. |
| 9,455,568 | B2 | 9/2016 | Wagoner et al. |
| 2002/0084655 | A1 | 7/2002 | Lof et al. |
| 2002/0087234 | A1 | 7/2002 | Lof et al. |
| 2003/0006613 | A1 | 1/2003 | Lof et al. |
| 2005/0040711 | A1* | 2/2005 | West .......... H02J 7/35 307/82 |
| 2005/0127680 | A1 | 6/2005 | Lof et al. |
| 2006/0126242 | A1 | 6/2006 | Datta et al. |
| 2009/0295162 | A1* | 12/2009 | Oohara ........... F03D 9/257 290/44 |
| 2011/0007534 | A1 | 1/2011 | Gupta et al. |
| 2012/0061959 | A1* | 3/2012 | Yasugi ............ H02P 9/10 290/44 |
| 2012/0200279 | A1 | 8/2012 | Pamulaparthy et al. |
| 2012/0268081 | A1* | 10/2012 | Tripathi ........ F03D 7/0272 322/28 |
| 2013/0128636 | A1 | 5/2013 | Trainer et al. |
| 2014/0145439 | A1 | 5/2014 | Burra et al. |
| 2014/0152109 | A1 | 6/2014 | Kanakasabai et al. |
| 2014/0247021 | A1* | 9/2014 | Wagoner ............ H02P 9/007 322/47 |
| 2015/0008671 | A1 | 1/2015 | Palomares Rentero et al. |
| 2017/0338651 | A1* | 11/2017 | Fishman ............ H02J 3/01 |
| 2019/0013753 | A1 | 1/2019 | Wang et al. |
| 2019/0024634 | A1* | 1/2019 | Tarnowski ........ F03D 7/028 |

OTHER PUBLICATIONS

Jayasinghe S. D. G. et al.: "A Dual Inverter with Integrated Energy Storage for Wind Power Systems", 2010 International Power Electronics Conference: IPEC-SAPPORO 2010; Sapporo, Japan, IEEE, Piscataway, NJ, Jun. 21, 2010, pp. 3182-3187.

Hendricks Delesposte Paulino et al.: "A Review of the Main Inverter Topologies Applied on the Integration of Renewable Energy Resources to the Grid", Power Electronics Conference (COBEP), 2011 Brazilian, IEEE, Sep. 11, 2011, pp. 963-969.

Mei Qiang et al.: "A Multi-Directional Power Converter for a Hybrid Renewable Energy Distributed Generation System with Battery Storage", Conference Proceedings, IPEMC 2006. CES/IEEE 5$^{th}$ International Power Electronics and Motion Control Conference Aug. 14-16, 2006, Shanghai, China, pp. 1-5.

EP Search Report, dated Sep. 5, 2019.

* cited by examiner

ENERGY STORAGE SYSTEM

FIELD

The present disclosure generally relates to energy storage systems. More particularly, the present disclosure relates energy storage systems that include components for charging an energy storage device from a power source, such as a generator of a wind turbine, and/or discharging the energy storage device, such as into a power grid.

BACKGROUND

Wind power is considered one of the cleanest, most environmentally friendly energy sources presently available, and wind turbines have gained increased attention in this regard. A modern wind turbine typically includes a tower, a nacelle mounted on the tower, a generator positioned in the nacelle, and one or more rotor blades. The one or more rotor blades convert kinetic energy of wind into mechanical energy using known airfoil principles. A drivetrain transmits the mechanical energy from the rotor blades to the generator. The generator then converts the mechanical energy to electrical energy that may be supplied to a utility grid.

Many wind turbines include pitch adjustment mechanism configured to adjust a pitch angle of the rotor blades. Such pitch adjustment mechanisms may be used to curtail wind turbine power generation, such as by pitching the rotor blades to reduce the kinetic energy extracted from the wind. Additionally, some wind turbines also include or are otherwise coupled to an energy storage system configured to store power generated by the wind turbine. For example, the energy storage system may store power generated by the wind turbine in one or more batteries, when such power is not needed by the utility grid. The energy storage system may then discharge the power stored in the batteries into the utility grid when additional power is needed, such as when the wind turbine is unable to produce power (e.g., no wind is present). In this respect, the energy storage system includes various converters and other electrical components configured to modify or otherwise adjust the power produced by the generator (e.g., convert from AC to DC, reduce voltage, etc.) such the power is suitable for charging the energy storage device. However, such energy storage systems require complex and expensive filters and large inductors to protect the batteries from spikes or ripples in the electrical current supplied to the batteries from charging.

Accordingly, an improved energy storage system would be welcomed in the art.

BRIEF DESCRIPTION

Aspects and advantages of the technology will be set forth in part in the following description, or may be obvious from the description, or may be learned through practice of the technology.

In one aspect, the present disclosure is directed to an energy storage system including a power source and a power converter coupled to the power source. The power converter is configured to output power suitable for consumption in a utility grid. The energy storage system also includes an energy storage device configured to receive the power output from the power converter and a charge discharge converter coupled between the power converter and the energy storage device. The charge discharge converter is configured to control at least one of charging or discharging the energy storage device. Furthermore, the energy storage device includes a transformer coupled between the charge discharge converter and the power converter.

In another aspect, the present disclosure is directed a wind turbine including a rotor having a hub and at least one rotor blade extending from the hub. The wind turbine also includes a generator rotatably coupled to the rotor and a power converter coupled to the generator. The power converter is configured to output power suitable for consumption in a utility grid. Furthermore, the wind turbine includes an energy storage device configured to receive the power from the power converter and a charge discharge converter coupled between the power converter and the energy storage device. The charge discharge converter is configured to control at least one of charging or discharging the energy storage device. Additionally, the wind turbine includes a transformer coupled between the charge discharge converter and the power converter.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
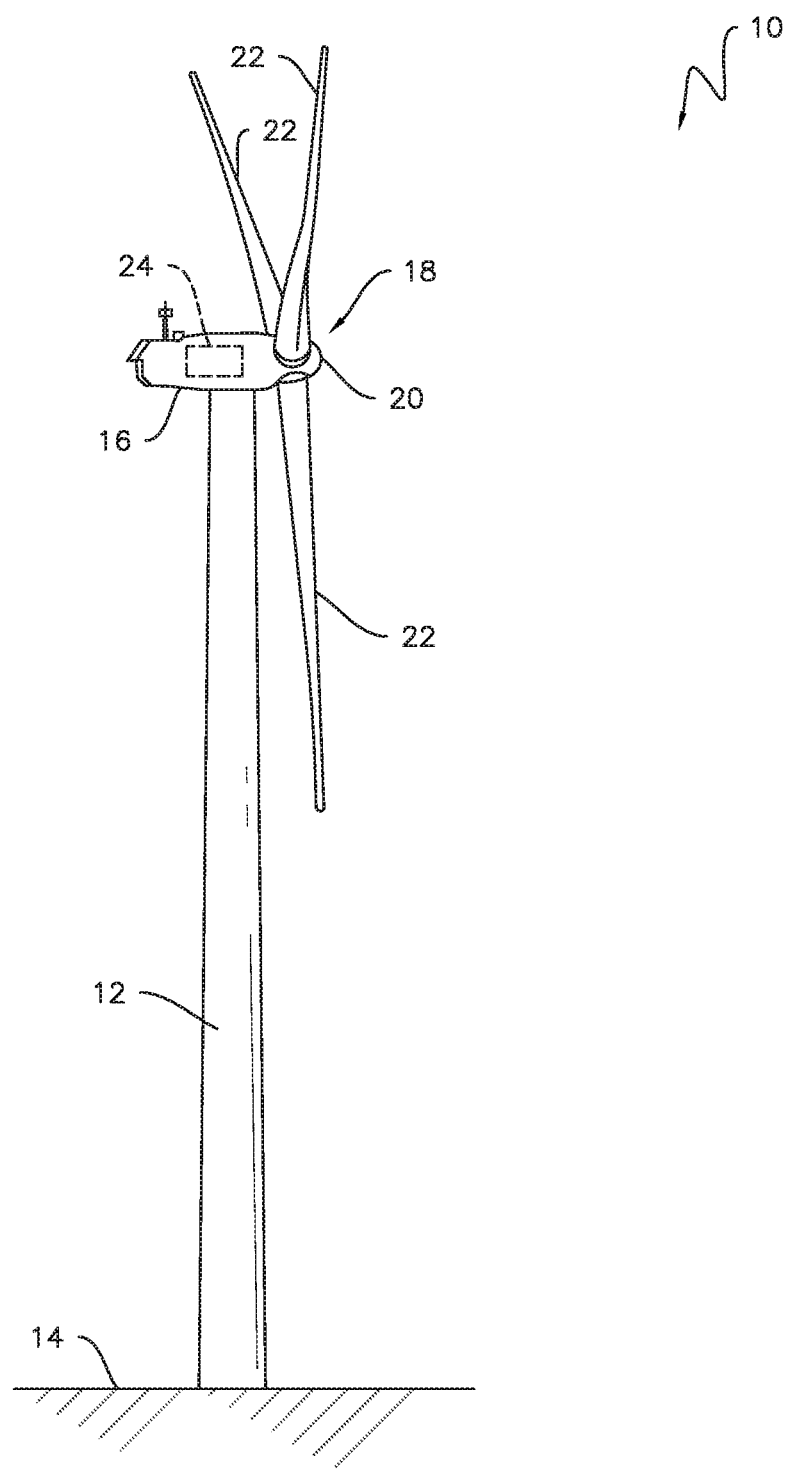
FIG. 1 is a perspective view of an exemplary wind turbine in accordance with aspects of the present disclosure.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Referring now to the drawings, FIG. 1 is a perspective view of one embodiment of an exemplary wind turbine 10 in accordance with aspects of the present disclosure. As shown, the wind turbine 10 generally includes a tower 12 extending from a support surface 14 and a machine head 16 mounted on the tower 12. In general, the machine head 16 includes a rotor 18 having a rotatable hub 20 and at least one rotor blade 22 coupled to and extending outwardly from the hub 20. For example, in the embodiment shown in FIG. 1, the rotor 18 includes three rotor blades 22. In alternative embodiments, however, the rotor 18 may include more or less than three rotor blades 22. Each rotor blade 22 may be spaced about the hub 20 to facilitate rotation the rotor 18 to convert kinetic energy from the wind into usable rotational, mechanical energy. Furthermore, the machine head 16 may include a generator 24 mechanically coupled to the rotor 18. As such, the generator 24 may generate electrical power from the rotational energy of the rotor 18.

The configuration of the wind turbine 10 described above and shown in FIG. 1 is provided only to place the present subject matter in an exemplary field of use. Thus, the present subject matter may be readily adaptable to any manner of wind turbine configuration.

Figure 2:
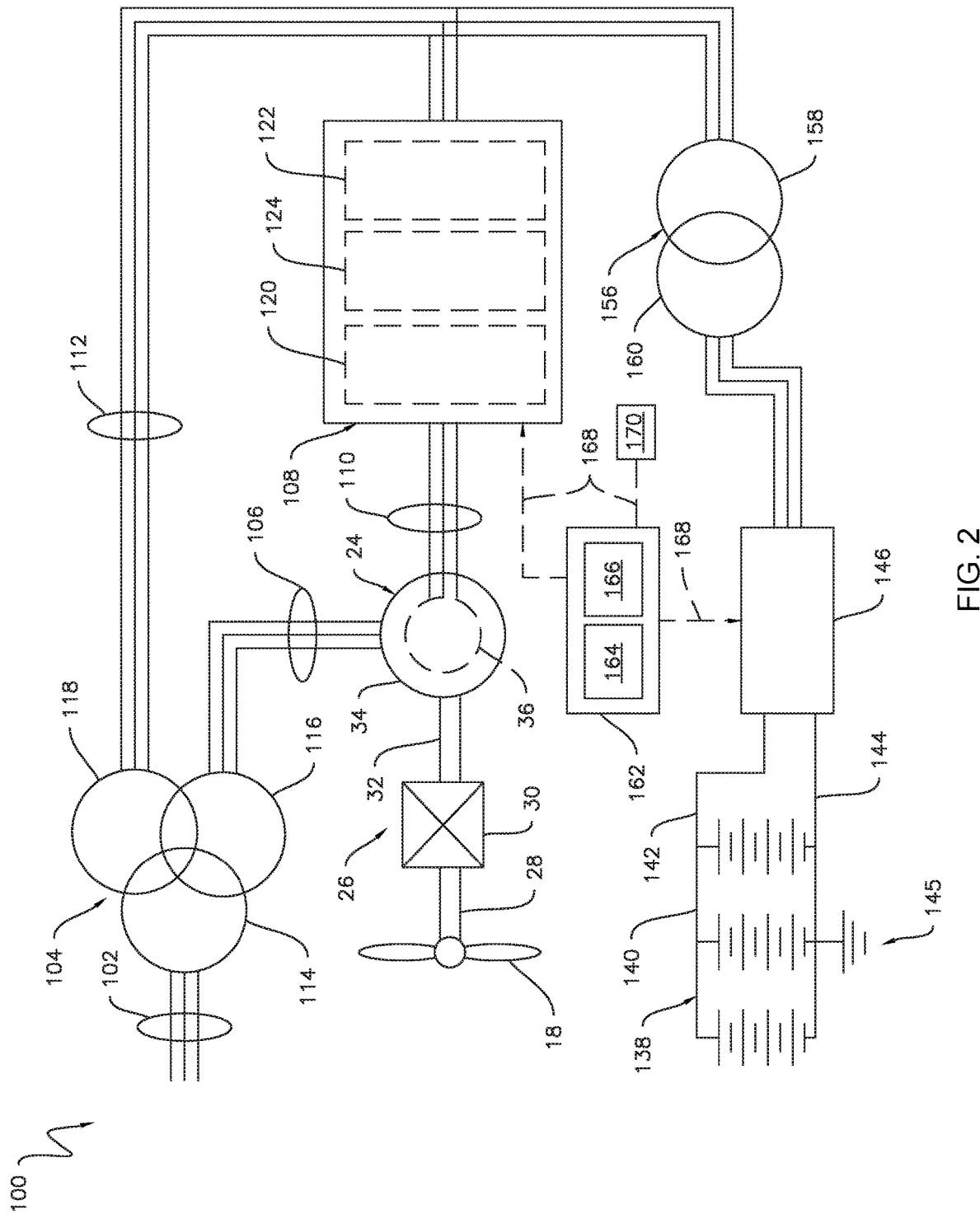
FIG. 2 is a schematic view of one embodiment of an energy storage system in accordance with aspects of the present disclosure.

FIG. 2 is a schematic view of one embodiment of an energy storage system 100 in accordance with aspects of the present disclosure. In general, the energy storage system 100 will be described herein with reference to the wind turbine 10 described above with reference to FIG. 1. Nevertheless, the disclosed system 100 may generally be used with wind turbines having any other suitable wind turbine configuration, such as direct drive permanent magnet generator using a full power conversion scheme. Moreover, the disclosed system 100 may with any other suitable type of power generation system, such a solar power system.

As shown in FIG. 2, the system 100 may include various components of the wind turbine 10. Specifically, in several embodiments, the system 100 may include the rotor 18, the generator 24, and a drivetrain 26 mechanically coupling the rotor 18 and the generator 24. For example, the drivetrain 26 may include a rotor shaft 28, which couples the rotor 18 to a gearbox 30. The drivetrain 26 may also include a generator shaft 32, which couples the gearbox 30 to the generator 24. In this respect, rotation of the rotor 18 drives the generator 24. More specifically, the rotor shaft 28 may provide a low speed, high torque input to the gearbox 30 in response to rotation of the rotor 18. The gearbox 30 may then convert the low speed, high torque input into a high speed, low torque output to drive the generator shaft 32 and, thus, the generator 24. Nevertheless, the drivetrain 26 may have any other suitable configuration, such as a direct drive configuration in which the rotor shaft 28 is directed connected to the generator 24.

As mentioned above, the system 100 may include the generator 24 of the wind turbine 10. More specifically, the generator 24 may include a stator 34 and a rotor 36 configured to rotate within the stator 34. The rotor 36 may be mechanically coupled to the generator shaft 32 such that rotation of the generator shaft 32 causes the rotor 36 to rotate within the stator 34, thereby generating electrical power. In the illustrated embodiment, the generator 24 produces three phase AC power. As such, in one embodiment, the generator 24 may correspond to a doubly-fed induction generator. Nevertheless, in alternative embodiments, the generator 24 may correspond to any other suitable type or configuration of generator configured to produce any other suitable power, such as DC power or AC power having more or fewer than three phases. Moreover, in further embodiments, the system 100 may include any other suitable power source in lieu of the generator 24, such as a solar panel.

Furthermore, the system 100 may be configured to provide AC power to a utility grid 102 via a dual path. More specifically, as shown, the stator 34 of the generator 24 may be coupled to a grid side transformer 104 via a stator bus 106. The rotor 36 of the generator 24 may be coupled to a power converter 108 via a rotor bus 110. The power converter 108 may, in turn, be coupled to the grid side transformer 104 via a grid side bus 112. The grid side transformer 104 may, in turn, be coupled to the utility grid 102. Nevertheless, in alternative embodiments, the generator 24 may be coupled to the grid 102 in any other suitable manner such that power produced by the generator 24 is supplied to the grid 102.

In the embodiment shown in FIG. 2, the grid side transformer 104 is a three-winding transformer. As such, the grid side transformer 104 includes a high voltage (e.g., greater than 12 kVAC) primary winding 114 coupled to the utility grid 102, a medium voltage (e.g., 6 kVAC) secondary winding 116 coupled to the stator bus 106, and a low voltage (e.g., 690 VAC) auxiliary winding 118 coupled to the grid side bus 112. Alternatively, the grid side transformer 104 may have only two windings (e.g., a primary winding 114 and a secondary winding 116), four windings (e.g., a primary winding 114, a secondary winding 116, an auxiliary winding 118, and an additional winding), or any other suitable number of windings.

As shown in FIG. 2, the power converter 108 generally includes a power source side converter 120 coupled to the rotor side bus 110 and a grid side converter 122 coupled to the grid side bus 112. The power converter 108 also includes a link 124 coupled between the power source side and grid side converters 120, 122. In one embodiment, the power source side converter 120 corresponds to an AC-DC converter configured to convert AC power from the rotor 36 of the generator 24 into DC power. As such, the link 124 corresponds to a DC link for receiving the DC power from the power source side converter 120. Furthermore, the grid side converter 122 corresponds to a DC-AC converter configured to convert DC power from the link 24 into AC power suitable for delivery to the utility grid 102. In alternative embodiments, however, the power converter 108 may have any other suitable topology. For example, in embodiments where the power source is a solar panel, the power converter 108 may have a suitable DC-DC topology.

Figure 3:
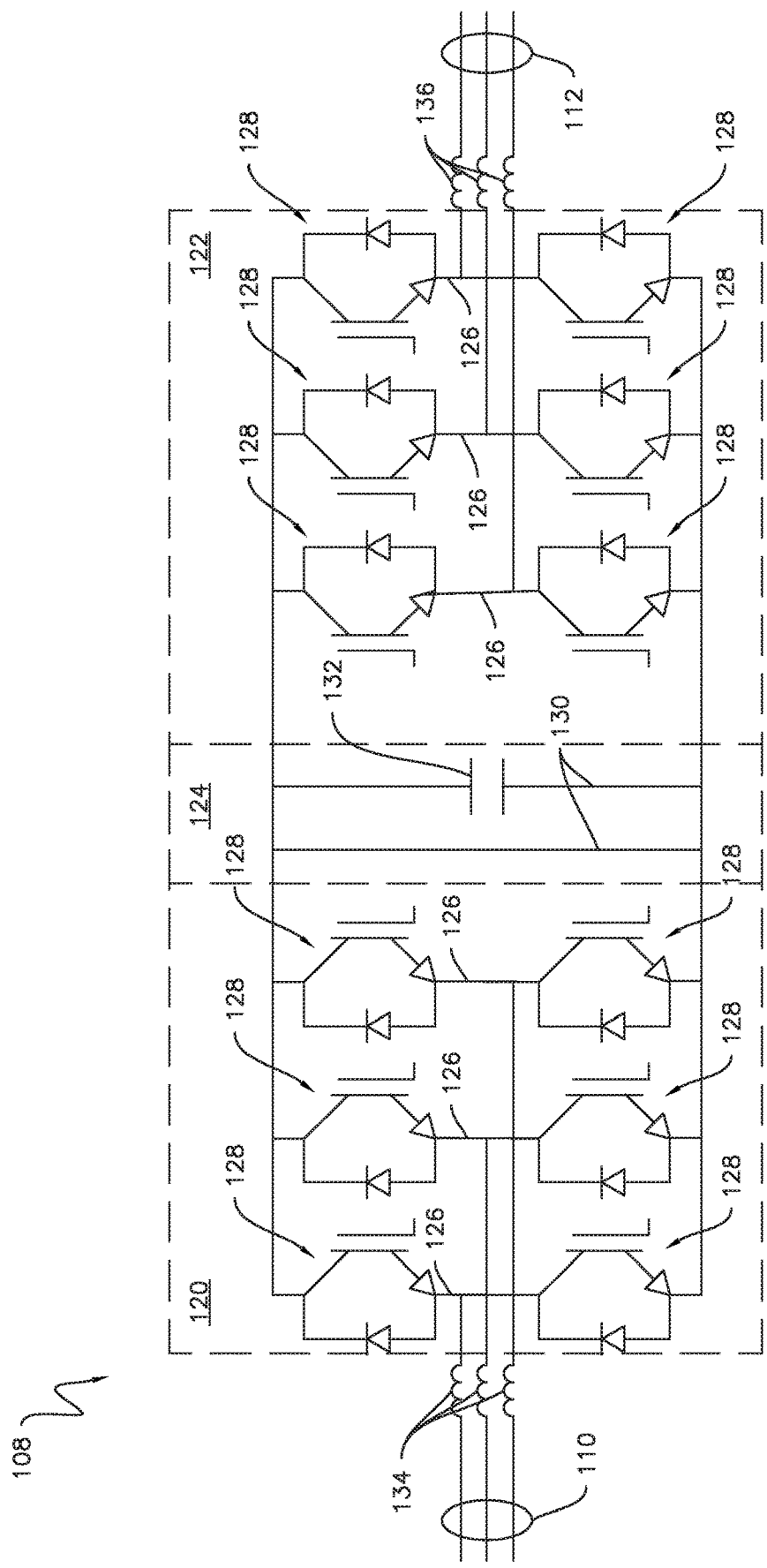
FIG. 3 is a schematic view of one embodiment of a power converter suitable for use in the energy storage system shown in FIG. 2 in accordance with aspects of the present disclosure.

FIG. 3 illustrates an exemplary embodiment of the power converter 108. As shown, the power source side and grid side converters 120, 122 both include a plurality of bridge circuits 126 coupled in parallel with each other. Each bridge circuit 126, in turn, includes a plurality of switching devices 128 coupled in series with each other. As will be described in greater detail below, the switching devices 128 may be modulated to adjust or otherwise modify various parameters of the power produced by the generator 24 (e.g., change the frequency, convert AC to DC, convert DC to AC, etc.) such that power is suitable for consumption in the grid 102.

Furthermore, the link 124 includes a plurality of bridge circuits 130, with one of such circuits 130 including a capacitor 132. Additionally, the power converter 108 may include a plurality of inductors 134 coupled between the power source side converter 120 and rotor side bus 110 and a plurality of inductors 136 coupled between the grid side converter 122 and grid side bus 112. In the illustrated embodiment, the switching devices 128 correspond to insulated gate bipolar transistors (IGBTs). Alternatively, the switching devices 128 may correspond to insulated gate commuted thyristors, metal-oxide semiconductor field-effect transistors (MOSFETs), silicon controlled rectifiers, or any other suitable switching devices. Furthermore, the power converter 108 may include any suitable combination of such switching devices.

Referring again to FIG. 2, the system 100 may also include an energy storage device 138. As will be described in greater detail below, the energy storage device 138 is configured to receive and store power from the power converter 108 (e.g., when such power is not needed by the grid 102) and discharge stored power into the grid 102 (e.g., such as when the wind turbine 10 is not operating). In one embodiment, the energy storage device 138 corresponds to one or more batteries 140. In such embodiment, the batteries 140 generally include a positive terminal 142 and a negative terminal 144, with the negative terminal being grounded at 145. Nevertheless, the energy storage device 138 may correspond to any other suitable energy storage device, such as an ultra-capacitor.

The system 100 may further include a charge discharge converter 146 coupled between the energy storage device 138 and the power converter 108. In general, the charge discharge converter 146 is configured to control the charging of the energy storage device 138 from the power converter 108 and the discharge of the energy storage device 138 into the grid 102. For example, the charge discharge converter 146 may be configured to convert AC power from the power converter 108 into DC power suitable for charging the energy storage device 138. Furthermore, the charge discharge converter 146 may be configured to convert DC power from the energy storage device 138 into AC power suitable for consumption in by the grid 102.

Figure 4:
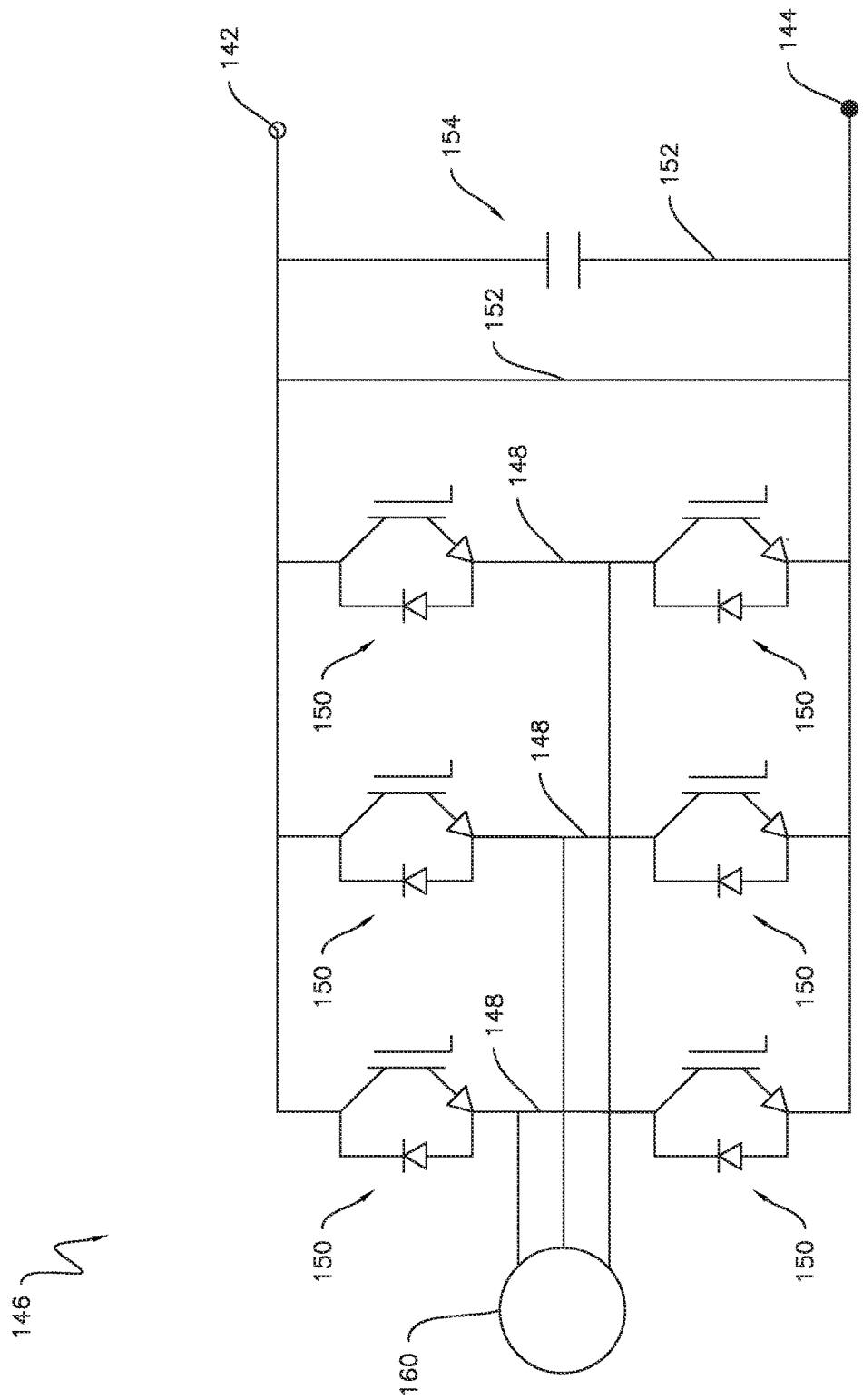
FIG. 4 is a schematic view of one embodiment of a charge discharge converter suitable for use in the energy storage system shown in FIG. 2 in accordance with aspects of the present disclosure.

FIG. 4 illustrates one embodiment of the charge discharge converter 146 in accordance with the present disclosure. In the illustrated embodiment, the charge discharge converter 146 corresponds to a bridge converter and, more particularly, to a three-phase bridge converter. As such, the charge discharge converter 146 may include a plurality of bridge circuits 148 coupled in parallel with each other. In the illustrated embodiment, the charge discharge converter 146 includes three bridge circuits 148 because the AC power supplied by the power converter 108 is three phase AC power. Nevertheless, in alternative embodiments, the charge discharge converter 146 may include more or fewer bridge circuits 148, such as when the AC power provided by the power converter 108 includes more or fewer phases. Each bridge circuit 148, in turn, includes a plurality of switching devices 150 coupled in series with each other. As will be described in greater detail below, the switching devices 150 may be modulated to charge and/or discharge the energy storage device 138. Furthermore, the charge discharge converter 146 may include a plurality of bridge circuits 152, with one of such circuits 152 including a capacitor 154. The plurality of bridge circuits 152 may be connected to a single or plurality of energy storage devices, with such energy storage devices being electrically coupled or may be electrically isolated. In the illustrated embodiment, the switching devices 150 correspond to IGBTs such that the charge discharge converter 146 corresponds to a four quadrant charge discharge converter. Alternatively, the switching devices 128 may correspond to insulated gate commuted thyristors, MOSFETs, silicon controlled rectifiers, or any other suitable switching devices. Furthermore, the charge discharge converter 146 may include any other suitable combination of such switching devices.

Referring again to FIG. 2, the system 100 further includes an energy storage side transformer 146 coupled between the power converter 108, such as the grid side converter 122 of the power converter 108, and charge discharge converter 146. As such, the energy storage side transformer 146 electrically isolates the energy storage device 138 from the power converter 108. As shown, the energy storage side transformer 146 is a two-winding transformer. In this respect, the energy storage side transformer 146 includes a primary winding 148 coupled to the power converter 108. Specifically, the primary winding 148 may be coupled to the grid side converter 122, the inductors 136 (FIG. 3), and/or the grid side bus 112. For example, in one embodiment, the primary winding 148 may be coupled between the inductors 136 and the grid side bus 112. Additionally, the energy storage side transformer 146 includes a secondary winding 150 coupled to the charge discharge converter 146. Alternatively, the energy storage side transformer 146 may have any other suitable number of windings.

Moreover, the system 100 may include a controller 162 configured to electronically control the operation of one or more components of the wind turbine 10 and/or the system 100. In general, the controller 162 may correspond to any suitable processor-based device, including one or more computing devices. As shown in FIG. 2, for example, the controller 162 may include one or more processors 164 and one or more associated memory devices 166 configured to perform a variety of computer-implemented functions (e.g., performing the methods, steps, calculations, and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory devices 166 may generally include memory element(s) including, but not limited to, a computer readable medium (e.g., random access memory (RAM)), a computer readable non-volatile medium (e.g., flash memory), a compact disc-read only memory (CD-ROM), a magneto-optical disk (MOD), a digital versatile disc (DVD), and/or other suitable memory elements or combinations thereof. The memory device 166 may store instructions that, when executed by the processor 164, cause the processor 164 to perform functions.

In several embodiments, the controller 162 may be configured to control an operation of the power converter 108 such that the power converter 108 provides the desired power conversion. Specifically, the controller 162 may be communicatively coupled to the power converter 108, thereby allowing the controller 162 to transmit control signals (e.g., as indicated by dashed arrows 168) to the power converter 108. Such control signals 168 may control the operation of the various switching devices 128 of the power converter 108. For example, the controller 162 may be configured to modulate the switching devices 128 of the power source side converter 120 to convert AC power provided by the generator 24 to DC power. Similarly, the controller 162 may be configured to modulate the switching devices 128 of the grid side converter 122 to convert DC power provided by the link 124 to AC power for consumption in the grid 102. Furthermore, the controller 162 may be configured to modulate to the operation of the switching devices 128 in a manner such that frequency of the AC power provided to the grid 102 is at a desired frequency (e.g., fifty Hertz, sixty Hertz, etc.). Nevertheless, in alternative embodiments, the controller 162 may control the power converter 108 in any other suitable manner such that the power converter 108 performs desired power conversion.

Furthermore, the controller 162 may also be configured to control the operation of the charge discharge converter 146 to charge and/or discharge the energy storage device 138. Specifically, the controller 162 may be communicatively coupled to the charge discharge converter 146, thereby allowing the controller 162 to transmit the control signals 168 to the charge discharge converter 146. Such control signals 168 may control the operation of the various switching devices 150 of the charge discharge converter 146. For example, when the generator 24 produces excess or surplus power, the controller 162 may be configured to modulate the switching devices 150 such power output from the power converter 108 is supplied to the energy storage device 138, thereby charging the energy storage device 138. In several embodiments, the energy storage side transformer 156 is configured to reduce a voltage of the power provided by the power converter 108 to the energy storage device 138 such that the voltage is suitable for charging the energy storage device 138. Conversely, the controller 162 may be configured to modulate the switching devices 150 such power stored in the energy storage device 138 is discharged into the grid 102 (e.g., when the wind turbine 10 is not operating). During such discharge, the energy storage side transformer 156 is configured to increase the voltage of the power provided by the energy storage device 138 to the grid 102 such that the voltage is suitable for consumption in the grid 102. Nevertheless, in alternative embodiments, the controller 162 may control the charge discharge converter 146 in any other suitable manner such that the energy storage device 138 is charged and/or discharged in the desired manner.

Furthermore, in some embodiments, the controller 162 may also be configured to control the operation of one or more components 170 (e.g., one or more pitch adjustment mechanisms) of the wind turbine 10. Specifically, the controller 162 may be communicatively coupled to such components 170, thereby allowing the controller 162 to transmit the control signals 168 to the component(s) 170. Such control signals 168 may control the operation of the component(s) 170.

Figure 5:
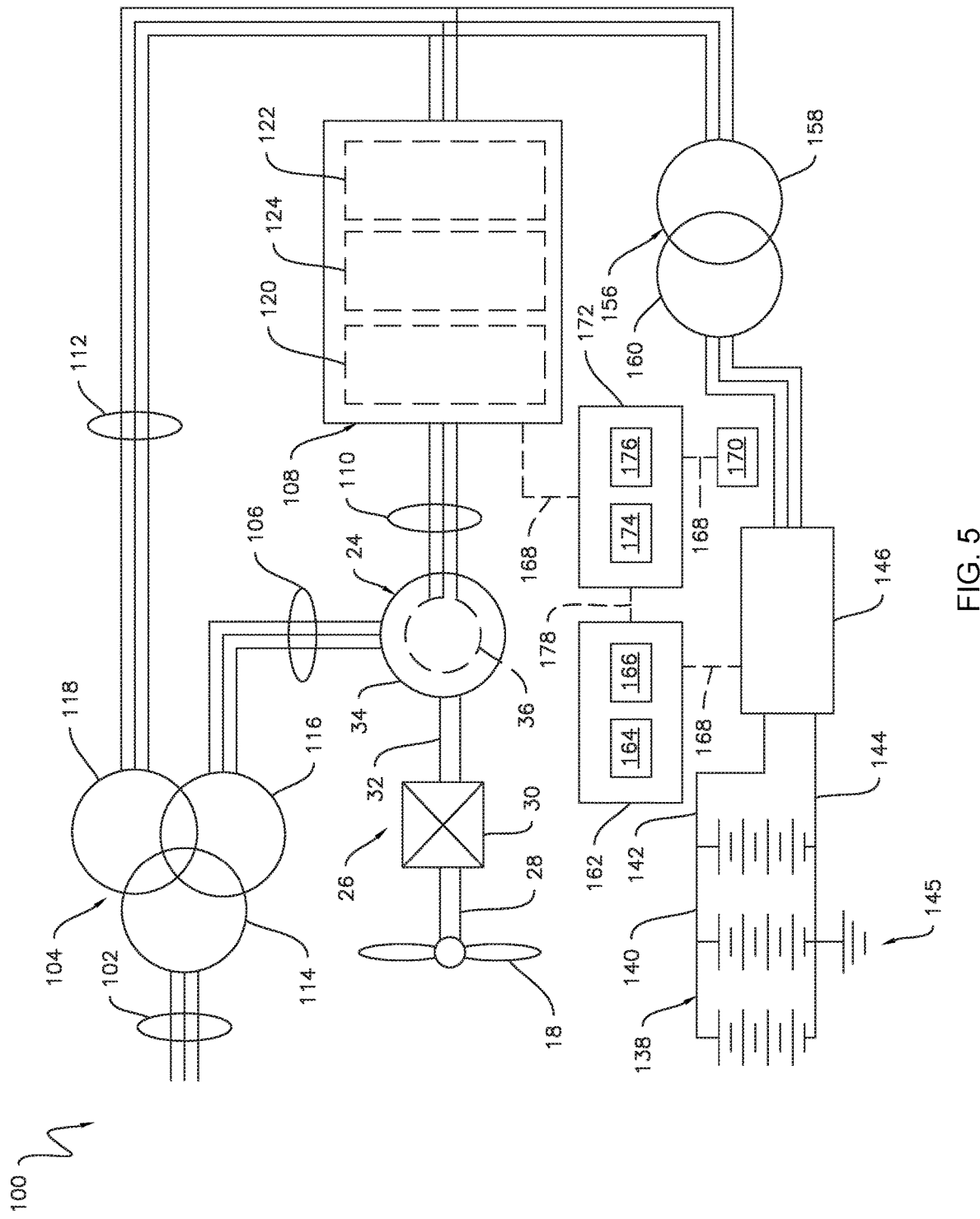
FIG. 5 is a schematic view of another embodiment an energy storage system in accordance with aspects of the present disclosure.

FIG. 5 illustrates another embodiment of the system 100 in accordance with aspects of the present disclosure. As shown, the embodiment of the system 100 shown in FIG. 5 is similar to the embodiment of the system 100 shown in FIG. 2. For example, the system 100 of FIG. 5 includes the power converter 108, the charge discharge converter 146, and the one or more components 170 of the wind turbine 10. Nevertheless, unlike the embodiment of FIG. 3 in which the power converter 108, the charge discharge converter 146, and the component(s) 170 are controlled by a single controller (e.g., the controller 162), such components 108, 146, 170 are controlled by multiple controllers in the embodiment of FIG. 5.

As shown, the system 100 includes the controller 162 and a controller 172. In general, the controller 172 may correspond to any suitable processor-based device, including one or more computing devices. As shown in FIG. 5, for example, the controller 172 may include one or more processors 174 and one or more associated memory devices 176 configured to perform a variety of computer-implemented functions (e.g., performing the methods, steps, calculations, and the like disclosed herein). The controller 162 is configured to control the operation of the charge discharge converter 146 as described above. Furthermore, the controller 172 may be configured to control an operation of the power converter 108 such that the power converter 108 provides the desired power conversion. Specifically, the controller 172 may be communicatively coupled to the power converter 108, thereby allowing the controller 172 to transmit control signals (e.g., as indicated by dashed arrows 168) to the power converter 108. Such control signals 168 may control the operation of the various switching devices 128 of the power converter 108 as described above. Additionally, one of the controller 162, 172 may be configured to control the operation of the component(s) 170. In the embodiment shown in FIG. 5, the controller 172 is configured to control the operation of the component(s) 170. Nevertheless, the controller 162 may be configured to control the operation of such component(s) 170.

The various components of the system 100 and/or the wind turbine 10 may be controlled by one or more controllers. As described above, in one embodiment (FIG. 2), a single controller 162 is configured to control the power converter 108, the charge discharge converter 146, and the components 170 (e.g., pitch adjustment mechanisms) of the wind turbine 10. In another embodiment (FIG. 5), two controllers 162, 172 are configured to control the power converter 108, the charge discharge converter 146, and the components 170 (e.g., pitch adjustment mechanisms) of the wind turbine 10. Nevertheless, the components 108, 146, and/or 170 may be controlled by any suitable number and/or combination of controllers. Additionally, when the system 100 includes multiple controllers, such controllers 162, 172 may be communicatively coupled such that the controllers 162, 172 may be configured to transmit data (e.g., as indicated by dashed line 178) therebetween.

As described in greater detail above, the energy storage side transformer 156 is positioned between the power converter 108 and the energy storage device 138. As such, and unlike with conventional energy storage systems, the energy storage side transformer 156 electrically isolates the energy storage device 138 from the power converter 108 and, more particularly, the link 124. Furthermore, as described above, the energy storage side transformer 156 adjusts the voltage of the power transferred by the power converter 108 and the energy storage device 138. In this respect, and unlike conventional systems, the expensive and complex filter circuits and large inductors are not needed to protect the energy storage device 138 from spikes and ripples in the power supplied thereto. Accordingly, the energy storage system 100 may be less expensive and more reliable than conventional systems.

Figure 6:
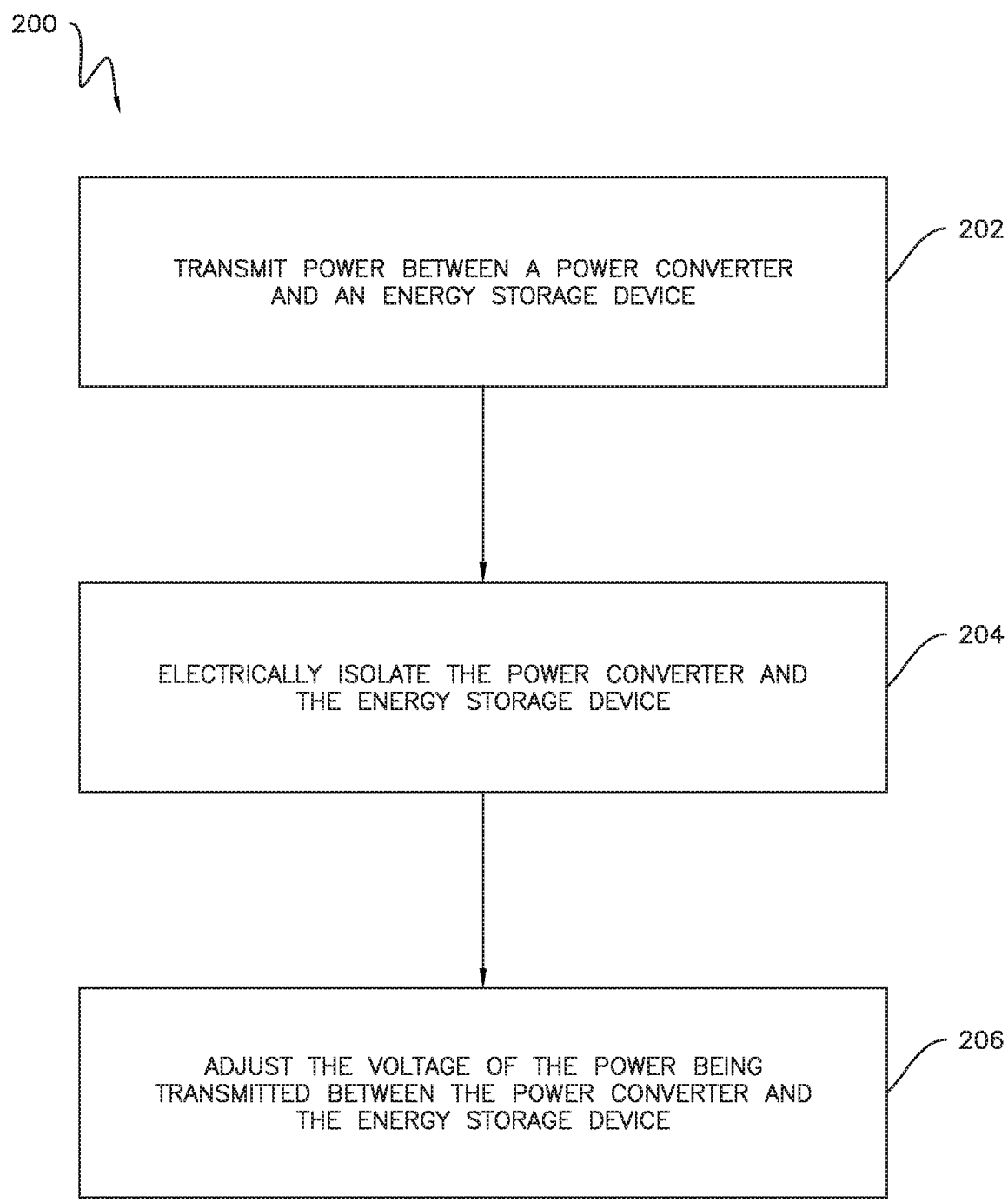
FIG. 6 is a flow diagram of one embodiment of a method for charging or discharging an energy storage device in accordance with aspects of the present disclosure.

FIG. 6 illustrates a flow diagram of one embodiment of a method 200 for charging or discharging an energy storage device in accordance with aspects of the present disclosure. In general, the method 200 will be described herein with reference to the wind turbine 10 and the system 100 described above with reference to FIGS. 1 through 5. However, the disclosed method 200 may generally be used to charge or discharge an energy storage device in connection with any wind turbine having any suit wind turbine configuration and/or any system having any suitable system configuration. In addition, although FIG. 6 depicts steps performed in a particular order for purposes of illustration and discussion, the methods discussed herein are not limited to any particular order or arrangement. However, the various steps of the methods disclosed herein can be omitted, rearranged, combined, and/or adapted in various ways without deviating from the scope of the present disclosure.

As shown in FIG. 6, at (202), the method 200 may include transmitting power between a power converter and an energy storage device. For example, as described above, the charge discharge converter 146 is configured to control the charging of the energy storage device 138 from the power converter 108 and the discharge of the energy storage device 138 into the grid 102.

Additionally, at (204), the method 200 may include electrically isolating the power converter and the energy storage device. For example, as described above, the energy storage side transformer 156 may be configured to electrically isolate the power converter 108 and the energy storage device 138.

Moreover, as shown in FIG. 6, at (206), the method 200 may include adjusting a voltage of the power being transmitted between the power converter and the energy storage device. For example, the energy storage side transformer 156 is configured to reduce the voltage of the power provided by the power converter 108 to the energy storage device 138 such that the voltage is suitable for charging the energy storage device 138. Furthermore, during such discharge of the energy storage device 138, the energy storage side transformer 156 is configured to increase the voltage of the power provided by the energy storage device 138 to the grid 102 such that the voltage is suitable for consumption in the grid 102.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A wind turbine, comprising:
 a rotor including a hub and at least one rotor blade extending from the hub;
 a generator rotatably coupled to the rotor;
 a grid side transformer coupled to the generator, the grid side transformer including a primary winding configured to be coupled to a utility grid, a secondary winding, and an auxiliary winding;
 a power converter coupled to the generator, the power converter being configured to output power suitable for consumption in the utility grid;
 a rotor side bus coupling the generator to the power converter;
 a grid side bus coupling the power converter to the auxiliary winding of the grid side transformer;
 a stator bus coupling the generator to the secondary winding of the grid side transformer, the stator bus being in parallel with the rotor side bus and the grid side bus;
 an energy storage device configured to receive the power from the power converter, the energy storage device coupled to the grid side bus between the power converter and the auxiliary winding of the grid side transformer;
 a charge discharge converter coupled between the power converter and the energy storage device, the charge discharge converter being configured to control at least one of charging or discharging the energy storage device; and,
 an energy storage side transformer coupled between the charge discharge converter and the power converter, the energy storage side transformer coupled to the power converter via the grid side bus.

2. The wind turbine of claim 1, wherein the power converter comprises a generator side AC-DC converter, a grid side DC-AC converter, and a DC link coupled between the generator side AC-DC converter and the grid side DC-AC converter, the energy storage side transformer being coupled between the grid side DC-AC converter and the energy storage device.

3. The wind turbine of claim 2, further comprising:
 a plurality of inductors coupled between the grid side DC-AC converter and the transformer.

4. The wind turbine of claim 1, wherein the charge discharge converter corresponds to a bridge converter.

5. The wind turbine of claim 1, wherein the charge discharge converter corresponds to a four quadrant charge discharge converter.

6. The wind turbine of claim 1, wherein the charge discharge converter comprises a plurality of switching devices.

7. The wind turbine of claim 6, wherein one or more of the plurality of switching devices correspond to an insulated-gate bipolar transistor.

* * * * *